United States Patent Office 3,536,532
Patented Oct. 27, 1970

3,536,532
PRIMARY CELL FOR ELECTRIC BATTERIES
Nobuatsu Watanabe, Kyoto, and Masataro Fukuda, Osaka, Japan, assignors to Matsushita Electric Industrial Co., Ltd., Osaka, Japan, a corporation of Japan
Filed Apr. 7, 1969, Ser. No. 814,053
Claims priority, application Japan, Apr. 12, 1968, 43/25,115
Int. Cl. H01m *13/02*
U.S. Cl. 136—83          9 Claims

ABSTRACT OF THE DISCLOSURE

A electric current producing primary cell of high energy density which is composed of a negative electrode having a light metal as active material, a non-aqueous electrolyte and a positive electrode having a solid fluorinated carbon as active material, said solid fluorinated carbon being represented by the formula $(CF_x)_n$ wherein $x$ is not smaller than 0.5 but not larger than 1 and obtained by the fluorination of a crystalline carbon, such as graphite; and which has such advantages that the utility of the positive electrode active material is high and nearly 100%, that the flat characteristic of discharge voltage is excellent and that the shelf life is long owing to the chemical stability in the electrolyte of the fluorinated carbon used as active material.

Figure 1:
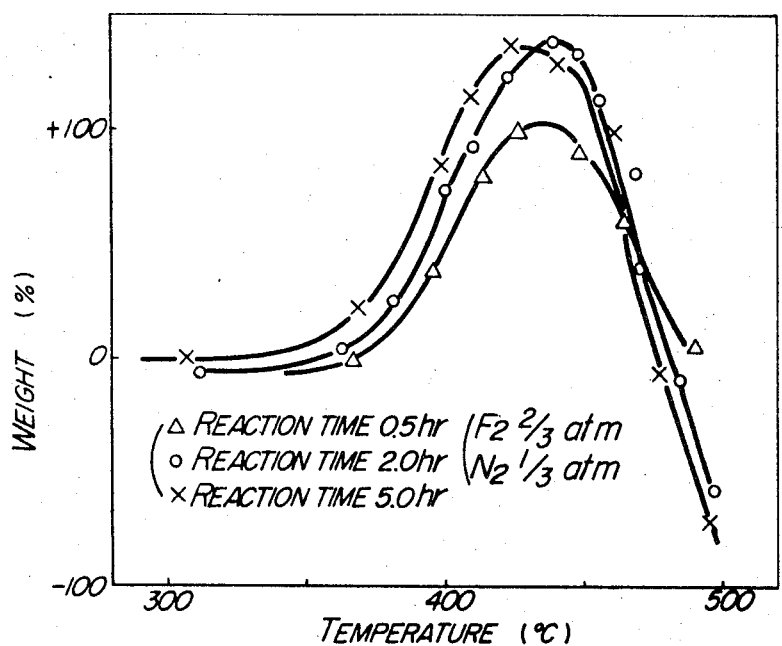

The present invention relates to improvements in the electric current producing primary cell of the type comprising a light metal of large electrical negativity, such as lithium or aluminum, as the negative electrode and a non-aqueous electrolyte, such as organic electrolyte, which does not dissolve the negative electrode.

What is particularly important to note is that the object of the present invention is to provide a cell of high energy density which has not been obtainable hitherto, by the use of a solid fluorinated carbon as a novel active material for positive electrode, said solid fluorinated carbon being represented by the formula $(CF_x)_n$ wherein $x$ is not smaller than 0.5 but not larger than 1 and composed of carbon and fluorine, said carbon consisting primarily of a crystalline carbon, such as natural graphite or artificial graphite.

More specifically, the present invention provides a cell system including a fluorinated carbon, which, as apparent from the comparison shown in Table 1, is outstandingly superior to the conventional battery systems using halides of nickel, copper, etc., which have heretofore been believed to be the active materials of the highest energy density theoretically as well as practically, as the positive electrode and lithium as the negative electrode.

TABLE 1

| | a.h./kg. | $E_0$ | w.h./kg. |
|---|---|---|---|
| $n\text{Li}+(CF)_n \rightarrow n\text{LiF}+nC$ | 864 | (3.5) | (3,000) |
| $2\text{Li}+\text{CuF} \rightarrow 2\text{LiF}+\text{Cu}$ | 436 | 3.53 | 1,640 |
| $2\text{Li}+\text{NiF}_2 \rightarrow 2\text{LiF}+\text{Ni}$ | 485 | 2.83 | 1,365 |
| $2\text{Li}+\text{CuCl}_2 \rightarrow 2\text{LiCl}+\text{Cu}$ | 362 | 3.08 | 1,111 |
| $2\text{Li}+\text{NiCl}_2 \rightarrow 2\text{LiCl}+\text{Ni}$ | 374 | 2.57 | 960 |

Further, a cell employing the battery system according to the present invention exhibits such meritorious features that the utility of the active material is high and nearly 100%, that the flat characteristic of discharge voltage is excellent and that the shelf life is long owing to the fact that the fluorinated carbon is chemically stable in the electrolyte and not hydroscopic per se. Still further, the use of carbon instead of nickel or copper enables the cell of this invention to be provided at a low cost and with high energy density.

It is also to be noted that according to the present invention in which use is made of non-aqueous electrolyte, it is possible to use lithium or sodium which cannot be used with aqueous electrolyte and, therefore, it is possible to obtain a small-size, light weight cell of high voltage and high energy density. Such a high energy density is the most important feature of the cell comprising non-aqueous electrolyte.

In this type of cell system, therefore, selection of a positive electrode active material to be used in combination with the negative electrode consisting of lithium or sodium, is of great importance. Namely, a positive electrode active material to be used in a cell of high energy density is required to have large discharge capacity per unit weight per se, to be large in electromotive force and enable a high terminal voltage to be obtained when used in a cell and to be active providing for quick discharge of the cell with little polarization and with satisfactory flatness of discharge voltage when the cell is discharged. Furthermore, the active material is required not to be decomposed or dissolved in the electrolyte or to cause a minimum self-discharge, which is obvious from the standpoint of the shelf life of the cell. The solid fluorinated carbon used in the present invention satisfies these conditions nearly completely as will be explained hereinafter.

In the past, the cells using alkali metals, such as lithium and sodium, as the negative electrode and non-aqueous electrolytes, have been studied for use for special purposes, mainly for military purposes. As the active material for the positive electrodes of such cells, fluorides and chlorides of copper, nickel, silver, etc. have mainly been examined, but none of them are entirely satisfactory and an optimum active material has not been found as yet.

Namely, copper fluoride is one of the active materials which are widely being studied by reason of the facts that its theoretical energy density is 0.53 a.h./g. and highest of all the active materials mentioned above and that it enables a terminal voltage as high as 3.0 to 3.4 v. to be obtained when used in a cell in combination with a lithium negative electrode, but, on the other hand, it has the fatal drawback that it can normally be obtained only in the form of $CuF_2 \cdot 2H_2O$ with crystal water because anhydrous copper fluoride $CuF_2$ is very unstable. Pure $CuF_2$ cannot be obtained by the dehydration of the crystal water-containing copper fluoride because the dehydration results in formation of CuF and/or CuO or in decomposition of the copper fluoride due to its water absorbing property. Another disadvantage is that the copper fluoride dissolves in the electrolyte in a cell, whereby the performance of the battery is degraded and the utility of the active material is reduced to as low as 50–60%. The copper fluoride is particularly unsatisfactory in that the discharge capacity of a cell incorporating the copper fluoride falls to below 50% of the initial value in a few days due to heavy self-discharge, and further in that the copper formed from the discharge reaction deposits on the lithium negative electrode, causing shorting between the electrodes. For the foregoing reasons, a reliable cell cannot be obtained with copper fluoride as active material for the positive electrode.

A cell incorporating copper chloride as the active material of the positive electrode has substantially the same defects as mentioned above relative to copper fluoride. Besides such defects, use of copper chloride involves further problems in respect of utility of the active material and shelf life of the cell, due to the presence of chlorine ion which results from the dissolution of the copper chloride.

Nickel fluoride $NiF_2$ and nickel chloride $NiCl_2$ are also reported to be unsatisfactory because, while they have a high energy density, i.e. 0.56 a.h./g. for $NiF_2$ and 0.41 a.h./g. for NiCl, anhydrides thereof are instable and have water absorbing property, and further the reactivities of these compounds in the battery system are low as compared with those of the aforesaid copper compounds and they are susceptible to polarization when incorporated in a cell, wherefore the flatness of discharge voltage of the battery is poor and a practical discharge performance cannot be obtained.

Silver chloride is another compound which has been examined as a stable active material. This compound, however, is not adapted for use in a cell of high energy density, except for special cases, since it is expensive and is as low as 0.19 a.h./g. in energy density.

In light of the fact that the presently proposed active materials for positive electrode are predominantly chlorides and fluorides, it is rather natural that fluorides of graphite of a structure represented by $(CF_x)_n$, wherein $x$ is larger than 0 but not larger than 0.25, has been proposed recently. The details of such fluorides have not been made public but it is assumed that fluorides of the formula $(CF_x)_n$ wherein $x$ is not larger than 0.25 are being used, in consideration of facility of production, and stability and electrical conductivity of the compounds. However, the fluorides of graphite being used at present suffer from the disadvantage that the energy densities thereof are in a range as low as from 0.2–0.4 a.h./g., and even the fluoride of the formula $(CF_{0.25})_n$ wherein the value of $x$ in the above general formula is largest, shows an energy density of 0.4 a.h./g. which is smaller than that of other active materials, e.g. 0.53 a.h./g. of $CuF_2$ and 0.56 a.h./g. of $NiF_2$.

The present invention proposes to use, as the active material for the positive electrode of a cell of the type described above, solid fluorinated carbon containing an extremely large proportion of fluorine, such as those represented by the formula $(CF_x)_n$ wherein $x$ is not smaller than 0.5 but not larger than 1, as contrasted to the conventional ones represented by the formula $(CF_x)_n$ wherein $x$ is larger than 0 but not larger than 0.25, which is obtained by the novel method which has previously been proposed by one of the present inventors and in which a carbon, preferably crystalline carbon, it reacted with fluorine gas at elevated temperatures. Notwithstanding the large fluorine content, the solid fluorinated carbons according to the invention are very stable in normal atmospheric conditions and yet have excellent theoretical energy density as an active material for primary cell, i.e. an energy density of 0.864 a.h./g. in case of $x=1$ or a carbon fluoride of the formula $(CF)_n$.

The present invention aims to provide a cell of satisfactory discharge performance and high energy density by the use of such a novel solid fluorinated carbon of the formula $(CF_x)_n$ wherein $x$ is not smaller than 0.5 but not larger than 1, as the active material for the positive electrode. As such active material, fluorinated carbons of greater fluorination degree or those which can be provided in solid form are used from the standpoint of energy density. In this view, a carbon fluoride of the formula $(CF_x)_n$ wherein the value of $x$ equal 1 and is largest, which is generally called polycarbon monofluoride in the art, is preferably used. In practice, however, it is recommendable to use fluorinated carbon of a suitable $x$ value in a range closer to 1, in consideration of easiness in controlling the production conditions and of economy. The fluorinated carbon of the highest fluorination degree, i.e. the one represented by the formula $(CF)_n$, is white in color, and the color of the other fluorinated carbons changes from gray to dark gray progressively as the degree of fluorination becomes lower.

In the present invention the fluorinated carbon used are restricted to those of the formula $(CF_x)_n$ wherein the value of $x$ is not smaller than 0.5 but not larger than 1, as described above, because if the value of $x$ is smaller than 0.5, a theoretical capacity of 0.6 a.h./g. or smaller will result which is not particularly superior to the energy densities of the conventional active materials, whereas if the value of $x$ is greater than 1, the fluorinated carbons cannot be used as the solid active material for primary cell.

The fluorinated carbons used in the present invention, which can be produced preferably in the manner illustrated in the example to be provided later, are solid fluorinated carbons obtained by the reaction between carbon and fluorine at elevated temperatures, which are characterized by their extremely large fluorine content, and the reaction is essentially different from the ordinary reaction between carbon and fluorine for the formation of gaseous low molecular weight fluorocarbons, e.g. $CF_4$ and $C_2F_4$. Further, the fluorinated carbons used in the invention are extremely stable thermally, even at a temperature of about 500° C., even when the value of $x$ in the formula $(CF_x)_n$ is 1 or approximates 1, and are also highly resistive to chemicals. It has been found by the present inventors that, owing to such properties, the composition of the fluorinated carbons, used as active material of a cell comprising a non-aqueous electrolyte, is not subjected to change, even when the adsorbed water adversely affecting the negative electrode is sufficiently removed by heating. It has also been found that, when the fluorinated carbons are incorporated in a cell, they demonstrate a satisfactory activity, notwithstanding the stable properties as described above, and thereby enable a satisfactory discharge performance to be obtained, and further they permit minimum self-discharge as they are not substantially dissolved or decomposed in the electrolyte.

Furthermore, because of the large fluorine content, the active materials according to the invention have an energy density in the range from 0.80 to 0.86 a.h./g., which could not be obtained from the conventional active materials. The specific gravity of the active materials proper is as large as from 2.6 to 2.7, which is greater than that of graphite or fluorinated carbons of the formula $(CF_x)_n$ wherein the valve of $x$ is not larger than 0.25. Therefore, the amount of active material per unit volume of the battery can be increased and a battery of small size, lightweight and high energy density can be obtained.

The structure analysis conducted by the present inventors suggests that in the solid fluorinated carbons according to the present invention the fluorine is disposed within the carbon crystal lattice layer. For the discharge reaction in a battery system, transfer of F in the positive electrode active material is essential as is shown by the reaction formula $(CF)_n + nLi \rightarrow (C)_n + nLiF$, representing the reaction of a carbon fluoride of the formula $(CF)_n$. The fluorinated carbons of the invention enable an excellent discharge performance to be obtained as stated above, presumably because the fluorine located within the carbon crystal lattice layer moves and reacts quickly. The solid carbon fluoride $(CF)_n$ is converted into carbon as a result of the discharge reaction and the carbon does not take a passive state, unlike metals. This is probably the reason why the electrical conductivity is increased as the discharge proceeds, the utility of the active material is improved and remarkable effects can be obtained in respect of the flat characteristic of the discharge curve, particularly in a high-rate discharge operation.

Figure 2:
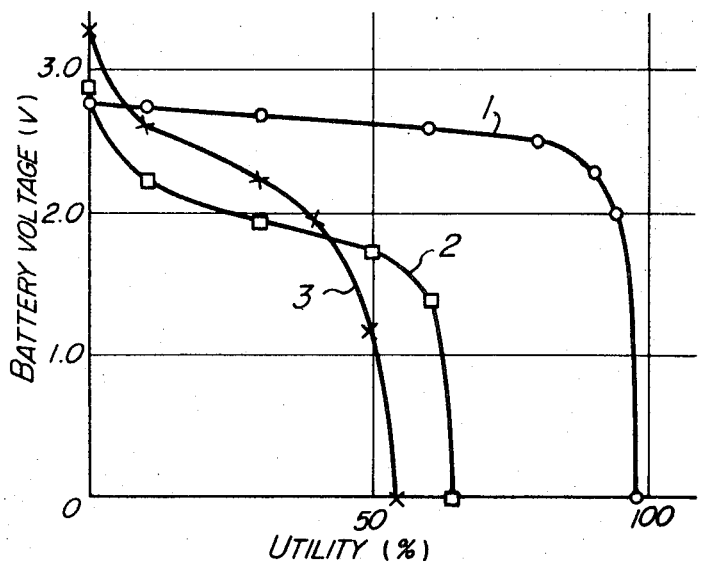

The present invention will be described in further detail by way of example illustrated in the accompanying drawings, in which:

FIG. 1 is a diagram showing the relationship between the amount of fluorine absorbed by graphite and the temperature; and FIG. 2 is a diagram showing the discharge characteristic of a battery according to this invention in comparison with those of conventional batteries.

First of all, a process for producing fluorinated carbon will be explained. A 200 mesh graphite powder was charged in a reactor made of nickel and the reactor was heated externally in an electric furnace while bleeding air therefrom, until it reaches a predetermined temperature. When the temperature had reached about 450° C., fluorine was slowly introduced into the reactor and the reaction between the fluorine and graphite was continued for about 2 hours while maintaining the fluorine pressure at 0.8 atmosphere. The particle size, the reaction temperature and the fluorine pressure can suitably be selected from the standpoint of economy. As an example, the relationship between the amount of fluorine absorbed by the graphite and the temperature is shown in FIG. 1. As seen, the reaction starts at a temperature higher than 300° C. and a temperature of 450° C. is optimum for the reaction, but when the temperature exceeds 450° C. the fluorinated graphite formed is further combined with fluorine and flown away in the form of gaseous $CF_4$, etc. Industrially and from the standpoint of production safety, the reaction for producing the fluorinated carbon is preferably carried out at a temperature of 350 to 450° C. for about 2 to 5 hours in a fluorine gas atmosphere at a pressure not greater than the atmospheric pressure, particularly preferably at a pressure of 0.5 to 0.8 atmosphere, although the reaction temperature is variable depending upon the reaction time.

The powder of fluorinated graphite obtained in the manner described above was mixed with an electrically conductive agent consisting of acetylene black and a binder consisting of polyethylene tetrafluoride powder at the weight ratio of 1:0.2:0.2 to prepare a positive electrode active material. Since the mixture is highly moldable, a positive electrode can be produced simply by molding the mixture with a nickel screen disposed centrally thereof. The size of the molded electrode was 40 x 40 x 1 mm. and the theoretical capacity thereof was about 2 ah. The negative electrode used in combination with the positive electrode was 40 x 40 x 0.4 mm. in size and had nickel leads connected thereto. The electrolyte used was a solution of 1 M lithium perchlorate $LiClO_4$ in one liter of propylene carbonate. As separator, a sheet of polypropylene nonwoven fabric having a thickness of 0.2 mm. was used. The elements described above were disposed in a polyethylene case and sealed therein to obtain a battery. The assembly of the battery was effected in a dry argon atmosphere.

The discharge characteristic of the battery when discharged at 100 ma. is represented by the curve 1 in FIG. 2. The curves 2 and 3 represent the discharge characteristics of batteries in which use is made of AgCl and $CuF_2$ as active material for the positive electrode respectively. The open circuit voltage used was 3.3 to 3.6 v. for the present battery, 2.85 v. for the battery of the characteristic curve 2, and 3.53 v. for the battery of the characteristic curve 3. From this chart, it will be seen that the discharge characteristic of the present battery is far superior to those of the conventional ones. Namely, the present battery is characterized by the fact that the utility of the active material is nearly 100% and that the flat characteristic is excellent. These advantageous features are believed to be brought about by the reason mentioned previously. The discharge voltage of the present battery is somewhat lower than that of the battery comprising $CuF_2$, in the initial stage of discharge operation, but the present battery is superior to the latter in respect of utility of the active material and flat characteristic. Therefore, upon evaluating the characteristics of the battery as a whole, it will be understood that the active material of the present invention is superior to the conventional ones. With reference to self-discharge, the active material of this invention showed substantially no deterioration even after storage of the battery for about 6 months.

In the example described above the production process was described as a general practice but, when the solid fluorinated graphite of this invention is used in a battery designed for low-rate discharge, blending of a metal powder or carbon powder, which is normally used as an electrically conductive ingredient, is not particularly needed, since solid fluorinated graphite possesses the property of carbon, i.e. electrical conductivity, in a considerable degree. This is advantageous in increasing the theoretical quantity of electrolyte charged in the battery. Such property of solid fluorinated graphite is exactly contrary to the original presumption that the property of fluorine-contained resin, e.g. ethylene tetrafluoride, would generally appear as the value of $x$ in the formula $(CF_x)_n$ becomes larger, and is one of the features of the solid fluorinated carbons produced by the process of this invention.

The solid fluorinated carbons of the invention are more water-repellent than the conventional active materials, but such a strong water-repellency will not have any adverse effect on the performance of the battery but is rather advantageous from the standpoint of stability of the active materials during storage, because, unlike the conventional active materials which are used in an aqueous electrolyte, the solid fluorinated carbons are used in an organic electrolyte.

Further, the solid fluorinated carbons of the invention are thermally stable as mentioned before. Therefore, in producing a positive electrode it is possible to sinter the binder in the molding mixture, which is normally used for increasing the strength of the product electrode and consists of a powder of polyethylene or polyethylene tetrachloride, by heating the electrode after said electrode has been molded of said molding mixture under pressure. This is advantageous not only in decreasing the amount of the binder used, but also in increasing the mechanical strength and improving the performance of the electrode.

Fluorides of nickel and copper normally have the water-absorbing property and even anhydrides of these compounds tend to react with water to crystal water. However, with the active materials of the present invention which do not have the water-absorbing property, a paste electrode can readily be obtained even by mixing them with an organic solvent-type binder, such as styrol-benzene, not speaking of a water-soluble binder, e.g. carboxymethlyl cellulose, and the paste electrode thus formed can be heated to completely remove the organic solvent or water therefrom, without changing the composition of the active material. Therefore, by the use of the active materials according to the invention, a battery comprising a strong positive electrode and having excellent discharge performance can be produced with much ease.

As will be understood from the foregoing description, the battery according to the present invention exhibits excellent discharge performance which has been unobtainable with the various active materials for positive electrode which have heretofore been examined for use in a battery of the type using a light metal, e.g. an alkali metal, as negative electrode and a non-aqueous electrolyte; is economically inexpensive and, therefore, is of great industrial value.

What is claimed is:

1. A primary cell comprising a negative electrode having as the active material a light metal, a non-aqueous electrolyte and a positive electrode having as the principal active material a crystalline fluorinated carbon represented by the formula $(CF_x)_n$ wherein $x$ is not smaller than 0.5 but not larger than 1.

2. A cell according to claim 1, in which the positive electrode comprises a powder of said fluorinated carbon and a binder therefor.

3. A cell according to claim 1, in which the positive electrode comprises a mixture of a powder of said fluorinated carbon, an electrically conducting agent and a binder therefor.

4. A cell according to claim 3 in which the conducting agent is acetylene black.

5. A cell according to claim 2 wherein the active material of the negative electrode is an alkali metal.

6. A cell according to claim 5 in which the alkali metal is lithium.

7. A cell according to claim 4 in which the negative electrode is lithium.

8. A cell according to claim 4 in which the fluorinated carbon, acetylene black and binder are in the weight ratio of 1:0.2:0.2 respectively.

9. A cell according to claim 4 in which a nickel screen is disposed within said positive electrode.

References Cited

UNITED STATES PATENTS 3,415,687 12/1968 Methlie _____ 136—100
3,424,621 1/1969 Rogers _____ 136—83 XR WINSTON A. DOUGLAS, Primary Examiner A. SKAPARS, Assistant Examiner U.S. Cl. X.R.

136—107, 121